Patented June 7, 1927.

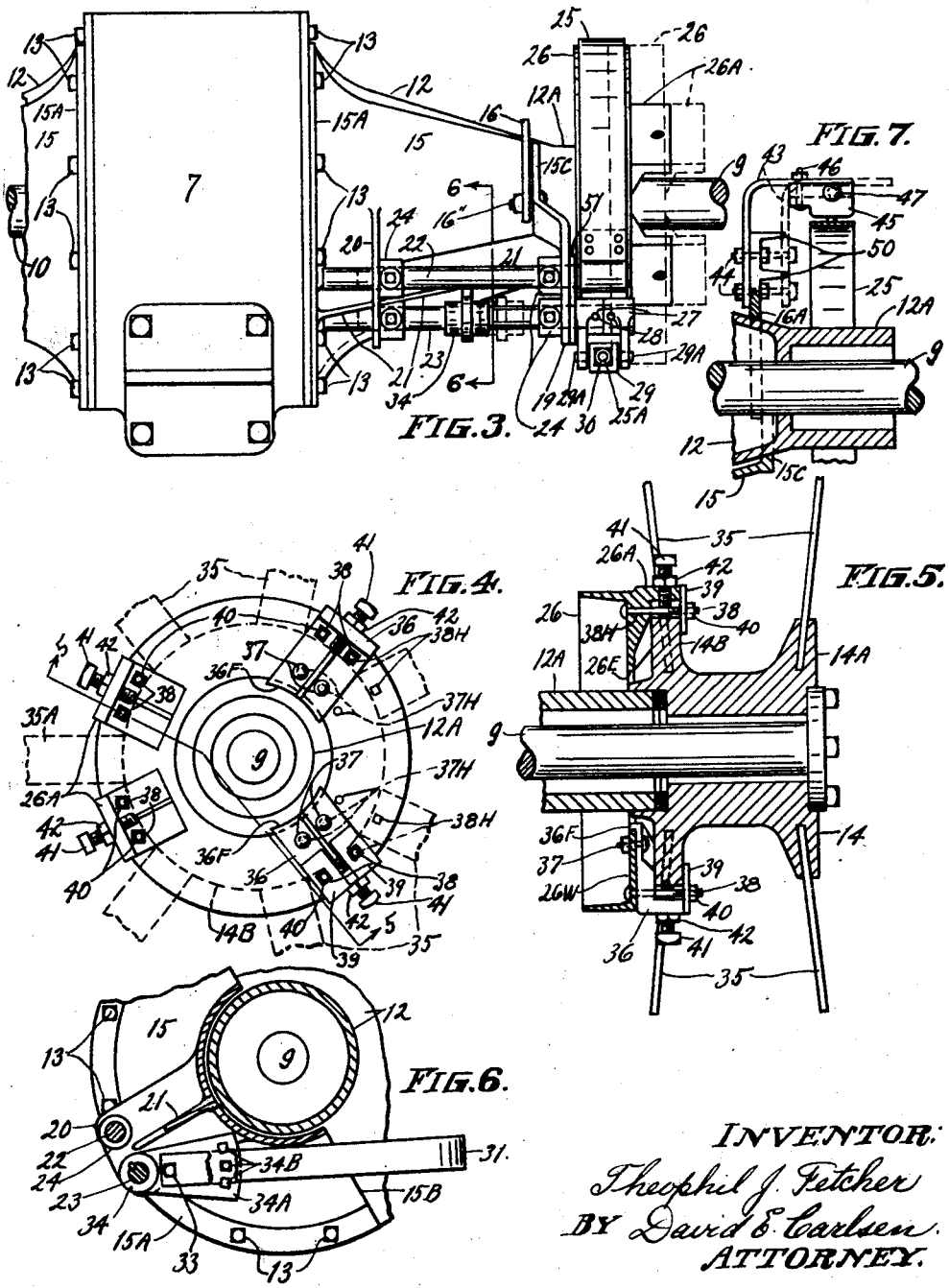

1,631,122

UNITED STATES PATENT OFFICE.

THEOPHIL J. FETCHER, OF NORWALK, WISCONSIN.

TRACTOR BRAKE.

Application filed January 7, 1926. Serial No. 79,773.

My invention relates to brakes particularly for tractors and which are removably attached to a tractor without removing the drive wheel fenders. The main object is to provide brakes for retarding or holding either drive wheel for the purpose of making short turns of the tractor while the opposite drive wheel continues to rotate and thus turn the tractor in a small area. Another object is to further improve on my tractor brake Patent 1,495,971 issued May 27, 1924. Other objects will become apparent in the following specification and in the accompanying drawings in which,—

Fig. 3 is a rear elevation of Fig. 1 showing the right hand brake device complete, the driver's seat being omitted.

Fig. 4 is an outside elevation of one of the brake drums of my device applied to a tractor drive wheel hub, the latter in dotted lines only.

Fig. 5 is a sectional elevation about as on line 5—5 in Fig. 4 with the wheel hub and adjacent parts added.

Fig. 6 is a sectional view about as on line 6—6 in Fig. 3.

Fig. 7 is a sectional view about as on line 7—7 in Fig. 1.

Figure 1:
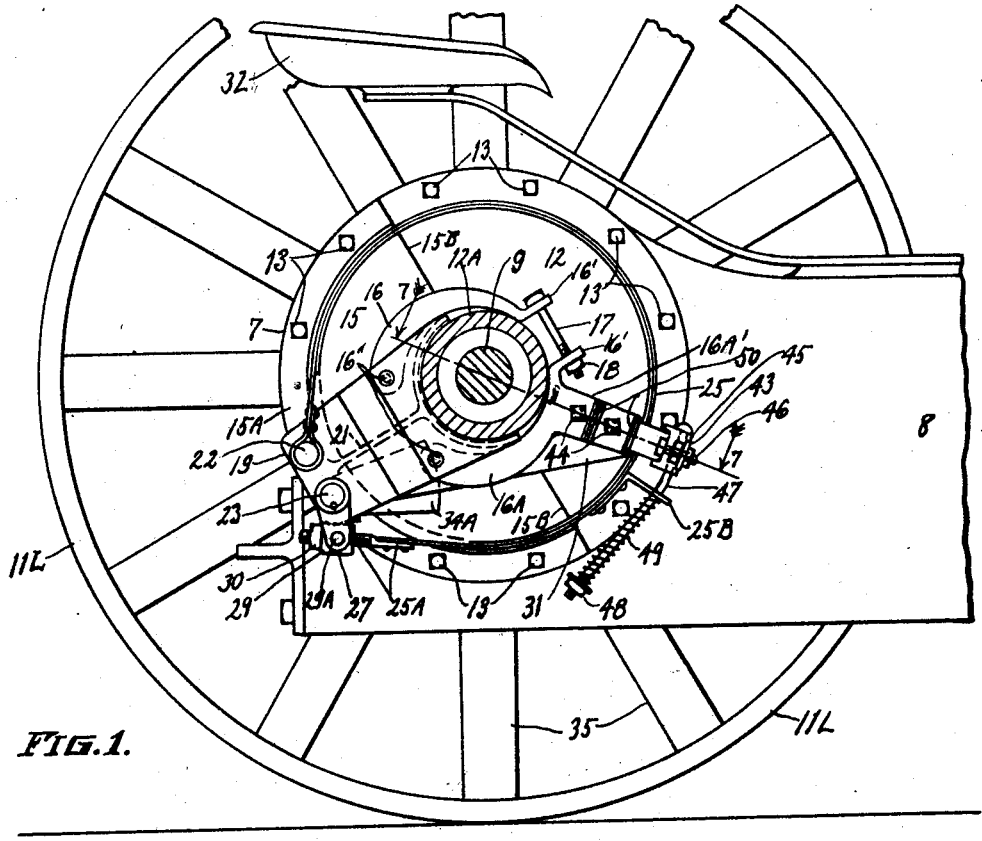
Fig. 1 is a right side elevation of the rear part of a tractor with my improved brake device mounted on the rear axle housing, certain brake parts and the right drive wheel being omitted.

Referring to the drawing by reference numerals, I have shown my devices attached to a tractor of the type having a differential housing 7 rearward of a transmission housing 8, said housing 7 containing the usual differential gears (not shown) for driving right and left axles 9 and 10 respectively for the right hand drive wheel $11^R$ and the left hand drive wheel $11^L$. 12 are two axle housings each secured at 13 to the differential housing 7 and extending outwardly therefrom toward the drive wheels and usually terminating in a straight cylindrical part $12^A$, the axles 9 and 10 being journalled centrally within the housings and extending beyond the ends thereof, their protruding ends adapted to be suitably keyed to the hubs 14 of the respective drive wheels. These housings 12 are tapered outwardly from the differential housings and each contains suitable bearings (not shown) for its drive axle.

My device comprises braking means for each drive wheel attached to the differential housing and to housing 12, having a foot lever for a contracting brake band frictionally engaging a certain type of brake drum detachably secured to the adjacent drive wheel as will now be described.

The brake mechanism involved for each drive wheel is a counterpart of the brake mechanism for the other drive wheel and description of one will suffice for both. In most of the views of the accompanying drawings I have shown my brake mechanism for the right hand drive wheel.

15 is the main casting or shell of each brake mechanism and comprises a tapered semi-sleeve the larger and inner end of which comprises an approximately semi-circular flange $15^A$ adapted to be secured by the bolts 13 to the differential housing in such a manner that the sleeve is open forwardly and upwardly, its front edge being about as $15^B$ in Fig. 1. The body of the sleeve is tapered outwardly to conform to the shape of the axle housing 12 and its outer reduced end, $15^C$, adapted to bear against housing 12 and clamped thereto by two clamping arms 16—$16^A$ pivoted as at 16″ rearward of the axle housing and curved toward each other to engage the housing 12 forward of its center (see Fig. 1) their forward ends being normally spaced apart and having each a lug 16′ with registering holes for a clamping bolt 17 with a nut 18 for drawing the members 16 against the housing 12 and thereby holding the outer end of the shell 15 firmly to the housing. $16^A$ is the lower clamp arm and has an integral forward extension $16^{A'}$ (Fig. 1) carrying means for supporting the brake band which will presently be described.

19 and 20 are respectively outer and inner rearwardly projecting arms are webs, both in vertical planes, the former cast integral with shell 15 at its outer end and the latter also cast integral and in spaced relation to flange $15^A$; both said arms braced by a central rearwardly directed rib 21 extending from web 19 to the flanged part $15^A$ (see Figs. 1, 2, 3 and 6).

22 and 23 are respectively an upper and a lower brake band shaft journalled in the webs 19 and 20 in parallel relation to the drive axle, said shafts projecting from said webs and both held from endwise movement by a suitable number of adjustable collars 24. The outer projecting end of shaft 22 is suitably engaged by one end of a brake band 25 (see Figs. 1, 2 and 3) loosely encircling a brake drum 26 (Figs. 1 and 5) detachably secured to the wheel hub 14. 27 are two short levers fixed as at 28 on the outer exposed end of shaft 23 (see Figs. 1 and 3) said two levers forming a clevis the arms of which are bored for pivots $29^A$ of a block 29, the latter being drilled for insertion of the lower reduced and threaded end $25^A$ of the brake band. The rearwardly protruding end of $25^A$ carries a nut 30 to adjust the band about the drum as desired. The clevis described is normally in depending position and the brake band loosely engaging the drum but when the shaft 23 is oscillated to swing the clevis rearwardly the brake band is of course immediately brought into contact with the drum and the rotation of the ground wheel is retarded or stopped as desired. The brake action is caused by a foot lever 31 extending forward from shaft 23 and terminating forward of the axle housing where it is accessible for downward pressure of the foot of the driver of the tractor, said driver usually seated as in a seat 32 above the differential housing. The foot lever 31 is preferably pivotally fixed as at 33 in the fan shaped web $34^A$ of a collar 34 suitably keyed on shaft 23 between the webs 19 and 20 of sleeve 15. Forward of 33 the lever 31 is bolted to web $34^A$ in any one of a series of holes $34^B$ arranged in an arc concentric to bolt 33 thus providing take-up as the brake band wears or may otherwise be needed to insure that lever 31 is normally in highest position when idle.

It is usual in tractor drive wheel construction to make the hubs thereof with end flanges as $14^A$, the outer flange and $14^B$ the inner flange, in which the inner ends of the wheel spokes 35 are cast or otherwise secured alternately. Some wheels have 12 and others 14 or more spokes and to provide for these varying conditions I make my brake drum with only two fixed integral lugs $26^A$ spaced apart circumferentially at or near the face of the drum and extending outwardly over the flange $14^B$ of the hub and far enough apart one on each side of a spoke as $35^A$ in Fig. 4. The lugs $26^A$ may preferably be spaced to touch spoke $35^A$ (not shown). In said Fig. 4 are shown seven spokes, being one half of the total spokes of a 14 spoke wheel. With the permanent lugs placed as described I provide two more lugs 36 but these are detachably secured to the web $26^W$ of the drum each by an inner pair of bolts 37 securable selectively in any pair of a series of circularly arranged holes $37^H$ in the web $26^W$ of the drum. 38 is an outer pair of bolts for each clamp 36 and adapted to be inserted in corresponding pairs of outer circumferentially arranged rows of holes $38^H$ (see Figs. 4 and 5) but these bolts are longer and located preferably just under each of the lugs $26^A$. These bolts carry each a perforated metal clip or plate 39 and a nut 40 outwardly thereof to clamp the clip against the outer face of the lugs $26^A$ or 36 and the outer face of the hub flange $14^B$ simultaneously, thus clamping the drum to the wheel hub. Each lug $26^A$—36 is drilled and threaded radially of the drum for an adjustment screw 41 with a lock nut 42. Adjustment of all the screws 41 which contact with the edge of flange $14^B$ makes provision for perfect centering of the brake drum. This centering is perhaps best accomplished first while only one of each pair of clips 39 are lightly pressed against flange $14^B$ and after the centering is satisfactory all the clips 39 should be tightly clamped. It is obvious that the brake drum lugs are securable to the drum in a position between any two spokes 35 but must be placed thus according to the position of the spokes which will vary according to the total number of spokes.

In order to provide proper suspension of the brake band I provide on the arm $16^{A'}$ of member $16^A$ an L-shaped hanger 43 fixed to said extension with two bolts 44 and one arm extending horizontally in front of the brake band where a casting block 45 is secured to the latter arm as at 46, said block being drilled transversely of bolt 46 for insertion of a headed rod 47 depending from lock 45 forward of the brake band and through an aperture in one arm of an L-shaped bracket $25^B$ fixed on the brake band and projecting radially therefrom. Below the bracket $25^B$ the rod is threaded for a nut 48 between which and the bracket a coil spring 49 about the rod may be compressed as needed to push the racket upwardly and hold the entire brake band in proper elevation (see Fig. 1.)

Figure 2:
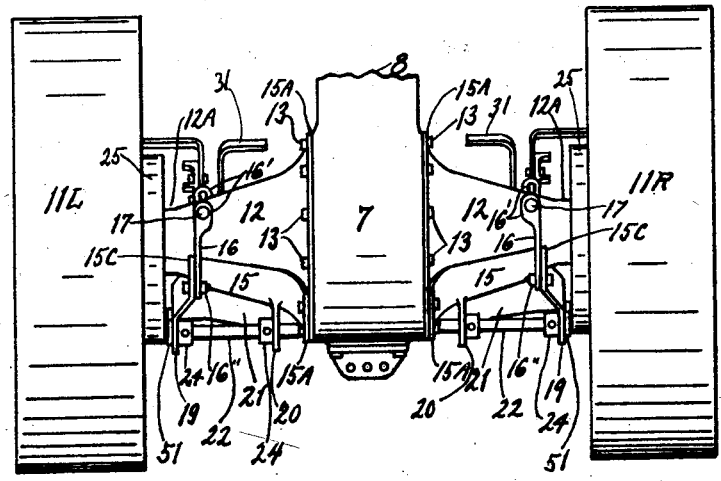
Fig. 2 is a top view of Fig. 1 in reduced scale and with the right hand drive wheel restored, both the right and left brake devices being shown.

In certain well known makes of tractors on which my brake devices are particularly applicable I have found that the drive wheels are spaced apart two different distances. To make my device applicable to both types it will be understood that the shafts 22 and 23 are readily slidable outwardly (for example) after loosening the collars 24 which of course means that the brake band is moved out to where it is in proper relation to the brake drum, as to position 26 dotted in Fig. 3. The brake band suspending means above described must of course also be moved outwardly a corresponding distance and this is done by simply moving the L-shaped bracket 43 to the outer side of arm 16^A and bolting it against suitable spaced lugs 50 preferably cast integral with arm 16^A', see Fig. 1 and dotted position of 43 in Fig. 7. 51 in Figs. 2 and 3 is a link connecting and bracing the ends of shafts 22 and 23 close to the brake band when they are in their outwardly extended position.

The operation of my devices on a tractor is already fully disclosed but it may be further added that in making a real short turn with a tractor the proper drive wheel may be held or retarded while the differential will automatically divert the driving power into the other drive wheel on the outside of the curve of the direction of turning thus reducing the momentum which would otherwise tend to throw the tractor on its side if both drive wheels were working while the steering wheels are directed at a sharp angle to make the turn.

What I claim is:

1. In a tractor having a pair of drive wheels, a differential housing intermediate thereof, a hollow axle housing extending from the differential housing and tapering toward each wheel; a brake drum detachably securable to the inner part of each wheel hub, a semi-conical shell tapered to conform to the axle housing and detachably securable to the rearwardly and downwardly exposed part of each of said axle housings, a pair of parallel shafts arranged parallel to the center line of the axle housing and journaled in said shell, a contracting brake band removably fixed with one end to one of said shafts, a clevis on the outer end of the other shaft, a foot lever mounted on the latter shaft, a block pivotally retained between the arms of said clevis, said brake band threaded at its free end and adjustably retained in said block to contract the band, means for retaining said shafts the brake band and foot lever in selective positions relative to the position of the brake drum, each of said shells having a pair of rearwardly projecting webs in which said parallel shafts are journaled, said means for retaining the shafts in various positions consisting of collars slidable on said shafts and adapted to be fixed thereto and in contact with said webs when the brake band is alined with the drum, and a link connecting the shafts outwardly of the outer web.

2. In a tractor having a pair of drive wheels, a differential housing intermediate thereof, a hollow axle housing extending from the differential housing and tapering toward each wheel; a brake drum detachably securable to the inner part of each wheel hub, a semi-conical shell tapered to conform to the axle housing and detachably secured to the rearwardly and downwardly exposed part of each of said axle housings, a pair of parallel shafts arranged parallel to the center line of the axle housing and journaled in said shell, a contracting brake band removably fixed with one end to one of said shafts, a clevis on the outer end of the other shaft, a foot lever mounted on the latter shaft, a block pivotally retained between the arms of said clevis, said brake band threaded at its free end and adjustably retained in said block to contract the band, means for retaining said shafts the brake band and foot lever in selective positions relative to the position of the brake drum, said foot lever comprising a hub member secured to the oscillable shaft, a forwardly extending integral fan shaped web, a bar pivotally secured to said web adjacent its hub, and extending forward of the axle housing; said web having a row of holes forward of the bar pivot and arranged in an arc concentric thereof, a single aperture provided in said bar and adapted to be alined with any of said holes in the web, and a bolt adapted to be inserted therein.

In testimony whereof I affix my signature.

THEOPHIL J. FETCHER.